United States Patent [19]

Morimura et al.

[11] Patent Number: 4,570,178

[45] Date of Patent: Feb. 11, 1986

[54] SOLID STATE COLOR IMAGING APPARATUS

[75] Inventors: Atsushi Morimura, Moriguchi; Hiromichi Tanaka, Hirakata, both of Japan

[73] Assignee: Matsushita Electric Industrial Co., Ltd., Kadoma, Japan

[21] Appl. No.: 510,301

[22] Filed: Jul. 1, 1983

[30] Foreign Application Priority Data

Jul. 5, 1982 [JP]   Japan ................... 57-117282

[51] Int. Cl.⁴ .............................................. H04N 9/07
[52] U.S. Cl. ......................................... 358/44; 358/41
[58] Field of Search ................................... 358/44, 41

[56] References Cited

U.S. PATENT DOCUMENTS

| | | | |
|---|---|---|---|
| 4,288,812 | 9/1981 | Rhodes | 358/44 |
| 4,388,640 | 6/1983 | Rhodes | 358/44 |
| 4,434,435 | 2/1984 | Fujimoto | 358/44 |
| 4,472,734 | 9/1984 | van de Polder | 358/44 |

FOREIGN PATENT DOCUMENTS 51-76015  7/1976  Japan .
55-24748  7/1980  Japan .

Primary Examiner—Michael A. Masinick
Attorney, Agent, or Firm—Cushman, Darby & Cushman

[57] ABSTRACT

Solid state imaging apparatus comprises a plurality of photoelectric elements disposed in arrays, where picture elements of odd number horizontal lines and those of even number horizontal lines are disposed shifted each other by half picture element pitch, and substantially vertical stripe shaped color filter elements are disposed repeating in horizontal direction with $1\frac{1}{2}$ pitches of the picture element, thus spatial phase of the color filter elements between neighboring horizontal lines of the picture elements differs by 180°, thereby enabling more effective utilization of the vertical correlation of the image.

5 Claims, 15 Drawing Figures n-th line (n+1)-th line

Composite signal

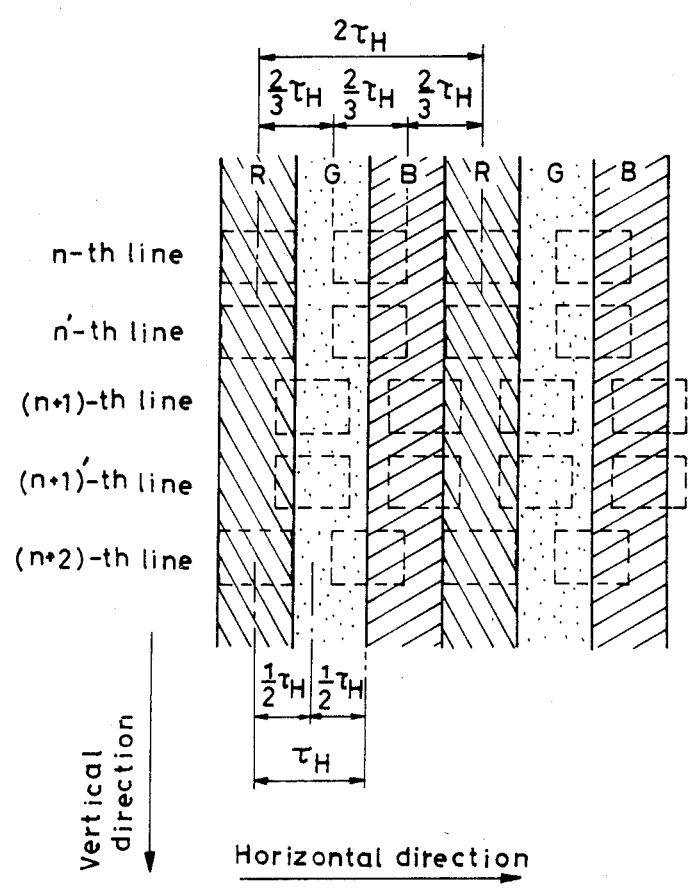
FIG.3 (Assignee's Prior Art)

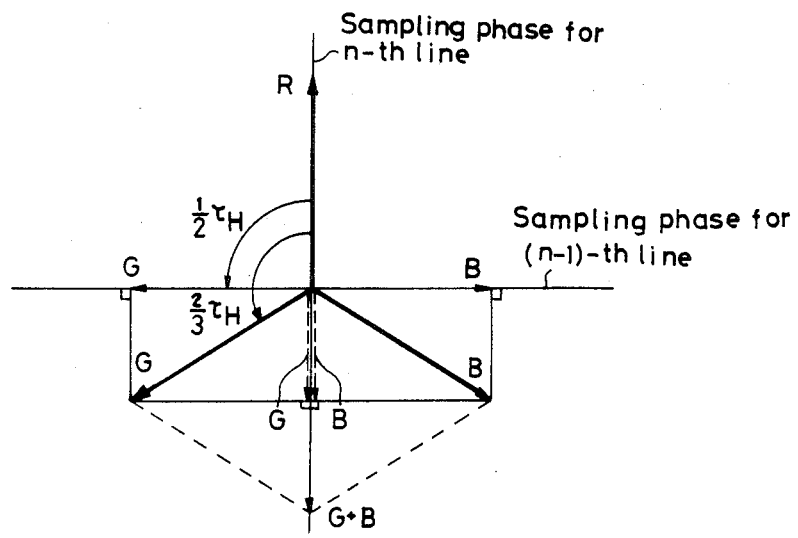
FIG.4 (Assignee's Prior Art)
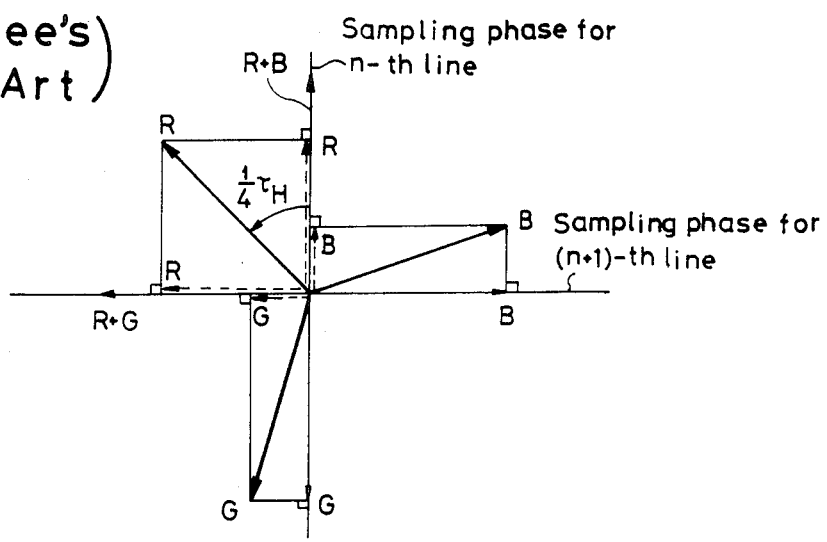
FIG.5 (Assignee's Prior Art)

FIG.6 (Assignee's Prior Art)
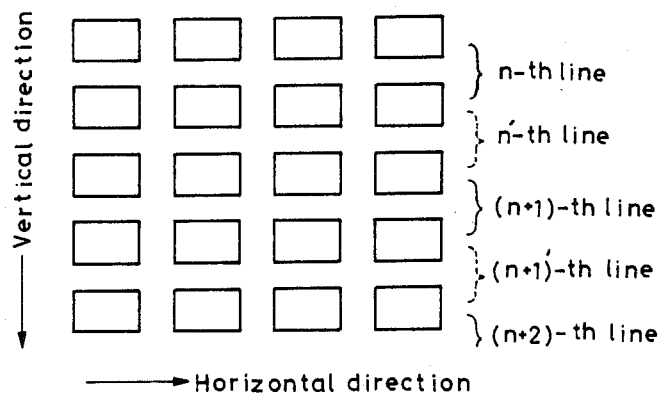
FIG.7
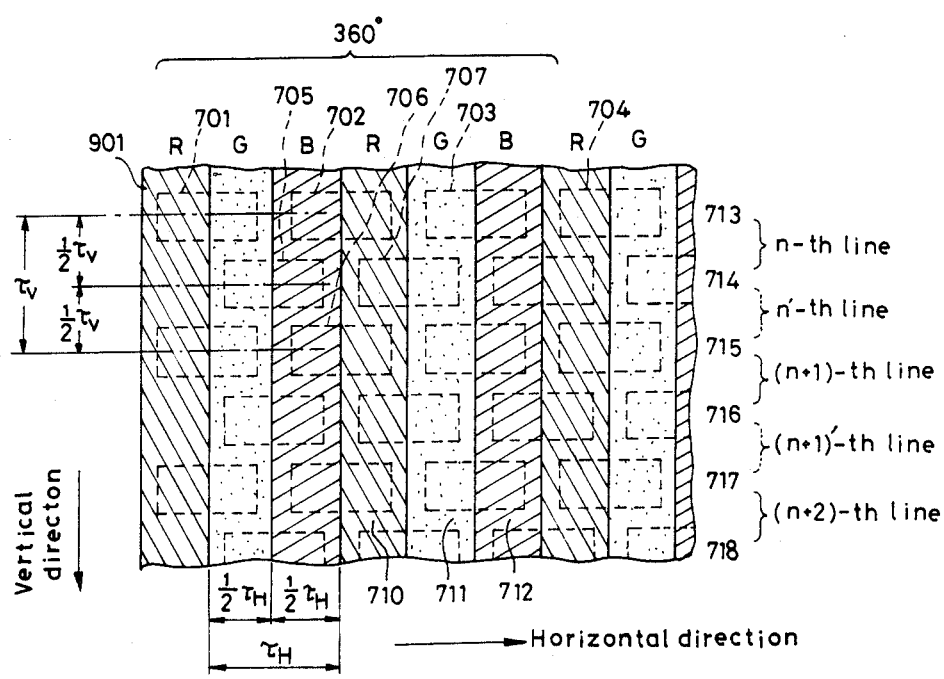

SOLID STATE COLOR IMAGING APPARATUS

BACKGROUND OF THE INVENTION

Arrangements are known in the prior art of solid state color imaging apparatus using a single-chip solid state image pickup device having a plurality of photoelectric elements disposed in two-dimensional array together with a color filter having a specially disposed filter elements pattern, wherein the photoelectric elements are disposed shifted by a half pitch between n-th line and (n+1)-th line, and the disposition of the filter elements is shifted by 180° of spatial phase of the filter element disposition, as shown in Japanese Patent Unexamined publication No. Sho 51-76015. The prior art is illustrated with reference to FIG. 1, which is a front view of a combined color filter and solid state image pickup device, wherein squares encircled by solid line designate color filter elements and smaller squares shown by dotted lines designate the photoelectric elements, and R, G and B show red filter, green filter and blue filter, respectively. This prior art intends to increase horizontal resolution by utilizing vertical correlation. Components of fundamental waves of signals in n-th horizontal line and (n+1)-th horizontal line obtained from the solid state image pickup device are shown in FIG. 2(a) and FIG. 2(b), respectively, wherein $f_s$ designates sampling frequency obtained from picture elements of the image sensor and is represented by the following equation:

$$f_s = \frac{1}{\tau_H}, \quad (1)$$

where $\tau_H$ is the time period between the signals of the picture elements. In this diagram the parts shown by dotted lines represent components of a signal produced by modulation by reading-out by the photoelectric elements, i.e., folding components. Generally in an imaging apparatus, to obtain a signal of high resolution is one of the most important matters. For this purpose, the read-out signal from the photoelectric elements should be utilized to the highest frequency region. However, in the highest frequency parts of the read-out signal from the photoelectric elements, as shown in FIG. 2(a) and FIG. 2(b), the folding components, i.e. components produced by sampling with the photoelectric elements are enclosed. Therefore, when the highest frequency parts are used without removing the folding components, so-called folding distortion is produced thereby degenerating the picture quality. Furthermore, when a single-chip solid state imaging sensor is used to pick up a color picture signal, chrominance signals are spatially modulated and are superposed on the read-out signal from the photoelectric elements. Then a carrier of the chrominance signal is produced at a frequency which is a quotient of the sampling frequency by a number of picture elements included within one spatial period of the color filter elements. This induces picture distortion. For instance, when color filter elements repeat at the spatial period of three picture elements, then as shown in FIG. 2(a) and FIG. 2(b), a chrominance signal carrier is generated at the frequency of $\frac{1}{3} \cdot f_s$, and its higher harmonic is generated at $\frac{2}{3} \cdot f_s$.

In the above-mentioned prior art, in order to obtain picture quality of a small distortion and high resolution signal, it is necessary to isolate chrominance carrier components and folding components produced by sampling by the picture elements of the image sensor from the genuine picture signal component. And in this prior art, the folding components are removed by making the phases of these folding components of a line and a subsequent line to be opposite to each other and adding the opposite phase components with each other. Furthermore, by selecting color filter element disposition to be in opposite phase relation between a horizontal line and the subsequent horizontal line, the chrominance signal carrier produced at $\frac{1}{3} \cdot f_s$ is also eliminated as a result of the addition of a signal of a horizontal line and a signal of the subsequent horizontal line. In this way, in the prior art, the composed signal becomes as shown in FIG. 2(c), where only the fundamental frequency range component shown by the solid line and the chrominance signal carrier at $\frac{2}{3} \cdot f_s$ exist, enabling utilization of components of frequency range up to immediately lower $\frac{2}{3} \cdot f_s$, thereby providing an imaging apparatus with reasonably small picture distortion.

However, in this prior art, the problem is that in order to assure the high resolution, an image projected on the photoelectric elements must have a vertical length over $\tau_v$ which is the vertical pitch of one horizontal line of scanning, thereby to give vertical correlation of the image. However, in an actual objective image, not all the image gives vertical correlation for more than $\tau_v$ in the vertical direction generally, and therefore the folding distortion induced by the sampling and the chrominance signal carrier at $\frac{1}{3} \cdot f_s$ cannot be sufficiently eliminated, thereby permitting introduction of picture distortion to some extent.

There has been another art which has not been published before the priority date of the present case and developed by the assignee corporation as described in the Japanese Patent Application No. Sho 56-24420. (Japanese Patent Unexamined Publication No. Sho 57-138281, published on Aug. 26, 1982. This is a basic application of the assignees prior U.S. Ser. No. 322,692, wherein horizontal dispositions of photoelectric elements between neighboring horizontal lines are shifted by $\tau_H/2$, where $\tau_H$ is horizontal picture element pitch, and color filter elements are disposed in vertical stripes with $\frac{2}{3} \cdot \tau_H$ pitch in horizontal direction as shown in FIG. 3.

In this second art, chrominance signals which are spatially modulated by a stripe color filter are further sampled by means of picture elements of the photoelectric elements, and the phase of sampling is shifted by 90° (i.e. $\tau_H/2$) between vertically neighboring horizontal lines, thereby producing a pair of different chrominance signals for even number horizontal lines and odd number horizontal lines, to be superposed on the luminance signal produced by the photoelectric elements. FIG. 4 shows the phase relation of chrominance signals which are sampled by picture element of the photoelectric elements and superposed on the luminance signal produced by the photoelectric elements. As shown in FIG. 4 the phase to be sampled by the picture elements of n-th horizontal line is in the same phase relation with that of the R component of the color filter, and the components R and G+B are superposed as the chrominance signal components on the luminance signal obtained from the photoelectric elements. In the next (n+1)-th horizontal line, G component and B component are superposed as the chrominance signal components. The feature of this prior art is that horizontal pitch of disposition of the color filter is selected to be $\frac{2}{3}$ times the horizontal pitch $\tau_H$ of the picture elements of the photoelectric elements. And by shifting the horizontal disposition of the picture elements by $\frac{1}{2}\cdot\tau_H$ at every line of horizontal scannings, the sampling phase at the time when an objective image which is spatially modulated by color filter is sampled by means of picture elements of the photoelectric elements, is changed. And thereby, chrominance signals are produced to be different from each other for odd number horizontal lines and even number horizontal lines, and the chrominance signals are to be superposed on the luminance signal obtained from the photoelectric elements. As a result of the above-mentioned structure, horizontal spatial relation between the picture elements and vertical stripe color filter elements can be further free. Further, vertical spatial relation between the filter and the picture elements are quite free since the color filter has a vertical stripe pattern. If the mutual horizontal relation between the color filter and the picture elements are shifted, the chrominance signals of respective horizontal scanning lines are sampled in a phase relation which is shifted by a phase angle corresponding to the spatial shift. Let us consider, for instance, an example where the color filter is horizontally shifted by $\frac{1}{4}\cdot\tau_H$ from the spatial relation shown in FIG. 3, and this case is elucidated. FIG. 5 shows components of chrominance signals to be sampled by the picture elements when the color filter is shifted by $\frac{1}{4}\cdot\tau_H$. In FIG. 5, components projected on n-th horizontal line change from G+B of FIG. 4 showing the case of FIG. 3 to R+B component and G component. And components projected on (n+1)-th line are changed from the G component and B component of FIG. 4 to R+G component and B component of FIG. 5. As shown in the above-mentioned comparison, as a result of horizontal shifting of the mutual spatial relation of the color filter against the picture elements, effects of the shifting appears only on phase shift of the chrominance signal components. Accordingly, when demodulating the chrominance signal superposed on the luminance signal, desirable chrominance signals similar to those of ideal horizontal spatial relationship are obtainable, only by compensating the phase relation of the chrominance signals.

Though the above-mentioned assignee's prior art has a feature that horizontal spatial relation between the color filter and the picture elements may be not so severe, the problem is that the carrier frequency of the chrominance signals appears at $\frac{1}{2}\cdot f_s$, for the $f_s$ sampling frequency of sampling by the picture elements. And since there is no appropriate method to eliminate this carrier signal of the chrominance signal, the luminance signal can be utilized only up to the frequency of $\frac{1}{2}\cdot f_s$, and therefore a high resolution imaging apparatus is not obtainable.

A still other prior art has been described in the Japanese Examined Patent Publication No. Sho 55-24748. In this still other prior art, reading of the picture elements are made simultaneously for vertically neighboring two horizontal lines of picture elements as shown in FIG. 6. In this case, in one field of reading or scanning, all the horizontal lines of picture elements are scanned in combination of lines shown by n-th line, (n+1)-th line, (n+2)-th line . . . , thereby reading all the horizontal lines and in the next field of scanning, i.e., interlace scanning, combination of horizontal lines is changed to n'-th line, (n+1)'-th line . . . , thereby again reading all the horizontal lines in different combinations and thus making interlace scanning. This still other prior art has a feature that there is no need of using a delay circuit for delaying one horizontal line scanning time for preparing two color-difference signals hitherto used for such solid state image sensor. And further, since each picture element is read out twice in the time period for scanning one frame, time required for scanning one frame of picture is only the scanning time of one field. Therefore, the time period of storing the charge corresponding to the signal can be halved, and the problem of undesirable after-image in the reproduced picture can be solved. However, a measure to increase horizontal resolution of the picture for such assignees' prior art has not been described in the above-mentioned prior art.

SUMMARY OF THE INVENTION

An object of the present invention is to provide a solid state color imaging apparatus capable of producing a picture signal of high horizontal resolution and which is easy to manufacture by alleviating necessity of vertical and horizontal registrations between the photoelectric elements and color filter to be disposed thereon.

The solid state color imaging apparatus in accordance with the present invention comprises:

a solid state imaging sensor comprising a plurality of photoelectric elements regularly disposed in two-dimensional patterns, the disposition comprising a plurality of horizontal lines, each having a plurality of photoelectric elements in repetition at a predetermined horizontal pitch, wherein dispositions of the photoelectric elements in vertically neighboring horizontal lines are horizontally shifted by half the predetermined horizontal pitch, a color filter disposed substantially in front of the solid state imaging sensor and comprising a plurality of color filter elements equivalently having three spectral characteristics and disposed in a predetermined order of repetition in horizontal direction, in a manner to have repetition spatial period of $1\frac{1}{2}$ times of the predetermined horizontal pitch, thereby producing a horizontal spatial relation between the color filter elements and photoelectric elements such that photoelectric elements of vertically neighboring elements being covered by the same kind color filter elements in positions which are horizontally shifted by a horizontal distance of $1\frac{1}{2}$ times the predetermined horizontal pitch, thereby repetition of combination of the photoelectric elements and the filter elements making 180° phase difference between neighboring lines of the photoelectric elements, and a circuit for reading output signals of the photoelectric elements, which in one field reads output signals simultaneously from odd number horizontal lines, and subsequent neighboring even number horizontal lines and in the next field reads output signals simultaneously from an even number horizontal lines and subsequent neighboring odd number horizontal lines.

The solid state color imaging apparatus in accordance with the present invention can provide a high resolution reproduced picture by enabling a utilization of output signal of the picture element as a luminance signal up to high frequency range as a result of successful elimination of the carrier signal of the sampling frequency in the output signal of the photoelectric elements and elimination of the folding component. The present invention is technically advantageous such that in a type for utilizing correlation of output of the picture elements of each other vertically neighboring lines, vertical distance of the picture elements which give vertical correlation is most short, i.e. immediately neighboring line. Thereby a high resolution reproduced picture is assured for almost objective image. Thus a high quality picture with small distortion and high resolution is obtainable. Furthermore, by employing a vertical stripe color filter, there is substantially no problem which has hitherto been induced by optical crosstalks in the vertical direction, and there is no severe manufacturing condition on vertical registration between the color filter and the solid state image sensor, and some deviation in horizontal registration can be compensated by means of matrix circuit design, thereby manufacturing becomes easy.

BRIEF DESCRIPTION OF THE DRAWING

FIG. 2(a), FIG. 2(b) and FIG. 2(c) are the frequency spectral diagram of the signal obtained from the solid state color imaging apparatus of FIG. 1, wherein FIG. 2(a) shows the component of n-th line, FIG. 2(b) shows the component of (n+1)-th line and FIG. 2(c) shows the composite component.

FIG. 3 is the front view of an assignee's prior stage solid state color image pickup device.

FIG. 4 is the phase diagram of the signal components of the color image pickup device of FIG. 3.

FIG. 5 is the phase diagram of the signal components of FIG. 3 apparatus when horizontal spatial relation between the photoelectric elements is shifted by ¼ of picture element pitch $\tau_H$.

FIG. 6 is the front view of the solid state image pickup device of the assignee's another prior art.

FIG. 7 is a front view of an example of a solid state color image pickup device in accordance with the present invention.

FIG. 8(a), FIG. 8(b) and FIG. 8(c) are frequency spectral diagram of the signal from the apparatus of FIG. 7, wherein FIG. 8(a) is the diagram for odd number line scannings and FIG. 8(b) is the diagram for even number line scanning and FIG. 8(c) is the diagram for composite signal.

DESCRIPTION OF THE PREFERRED EMBODIMENTS

Figure 1:
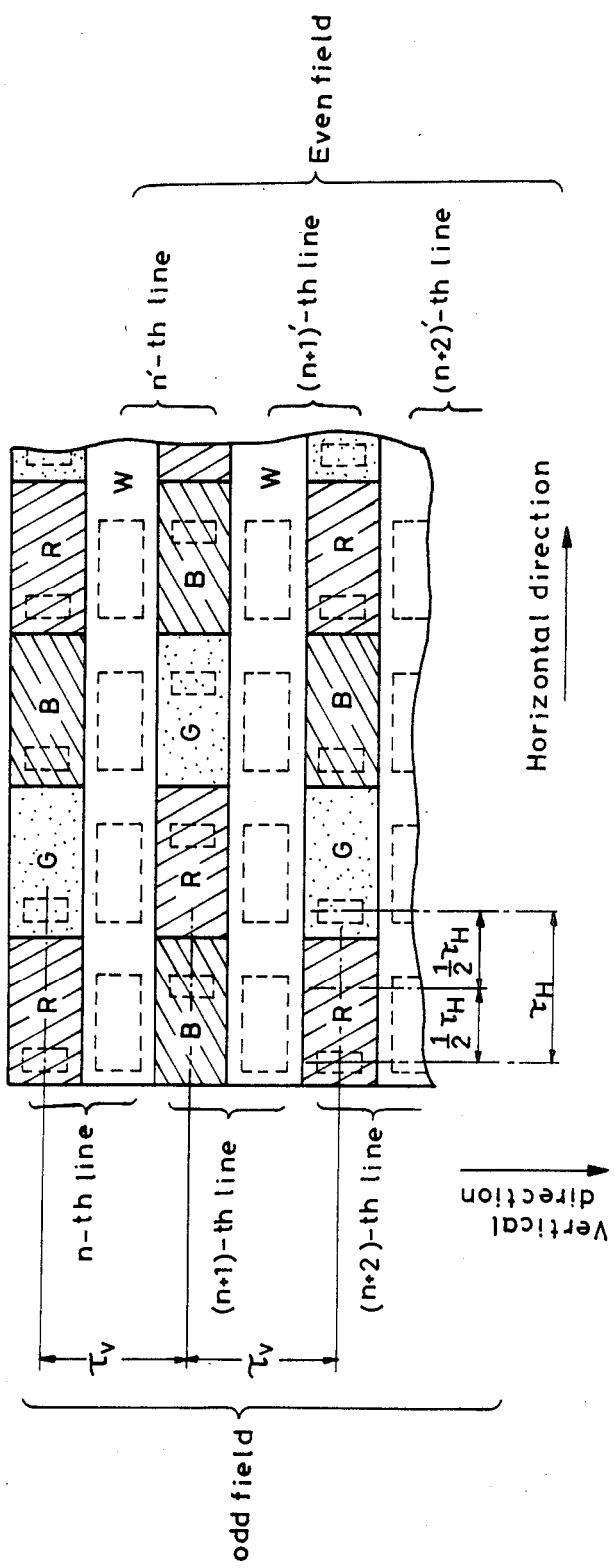
FIG. 1 is the front view of the prior art solid state color image pickup device.
Figure 2A:
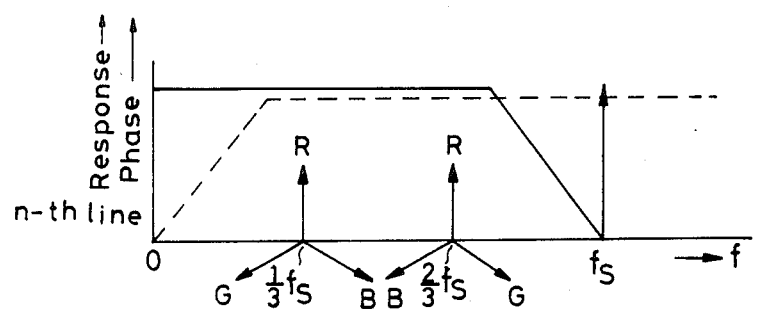
Figure 2B:
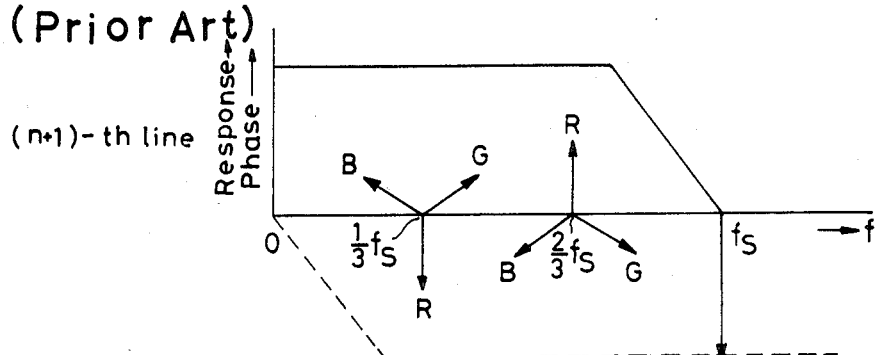
Figure 2C:
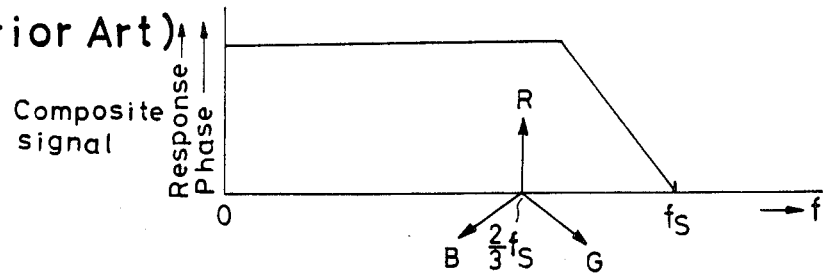

Hereinafter, the present invention is elucidated on preferred embodiments with reference to FIG. 7 and thereafter. FIG. 7 is a front view of a solid state color imaging apparatus embodying the present invention having a number of photoelectric transfer elements, hereinafter referred to as photoelectric elements, disposed in check-like pattern. That is, picture elements in odd number lines are disposed in vertical columns and photoelectric elements in even number horizontal lines are disposed in other vertical columns. Position of the picture elements of the odd number lines and the even number lines are different from each other in horizontal direction by half pitch ½·$\tau_H$ of horizontal disposition of respective horizontal lines. That is, for instance, in the first horizontal line 713, photoelectric elements 701, 702, 703, 704 . . . is disposed with a predetermined pitch $\tau_H$. In the next horizontal line 714, the photoelectric elements 705, 707, . . . are disposed with the same horizontal pitch $\tau_H$ but at positions which are shifted by ½·$\tau_H$ rightwards from the positions immediately under the photoelectric elements of the first horizontal line 713. And in a third horizontal line 715, the photoelectric elements are disposed at positions immediately under those of the first horizontal line 713. And in the similar way the even number horizontal lines and the odd number horizontal lines are disposed in check pattern manner of their photoelectric elements dispositions. Stripe-shaped color filters 710, 711, 712 are disposed substantially in front of the photoelectric elements array in substantially vertical parallel stripe disposed with ½·$\tau_H$, i.e. with half horizontal pitch of the disposition of the photoelectric elements in horizontal lines. The color filter comprises elementally color filters 701, 702, 703 . . . equivalently having three kinds of different spectral transmittance. For instance, in the example of FIG. 7, a color filter 710 is a filter which passes red light (hereinafter referred as R filter), filter 711 is a filter for passing green light (hereinafter referred as G filter) and the filter 712 is for passing blue light (hereinafter referred as B filter). And the stripe shaped filters are disposed in the same repetition order with the ½·$\tau_H$ pitch inbetween. Therefore the repetition spatial period of the three kinds of filters are 3/2·$\tau_H$.

Figure 8A:
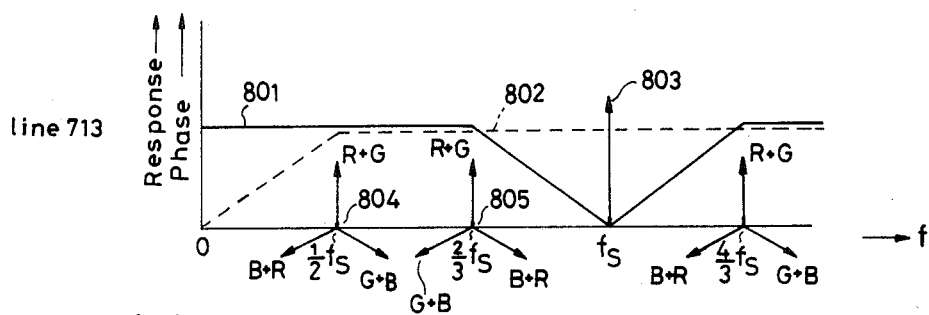
Figure 8B:
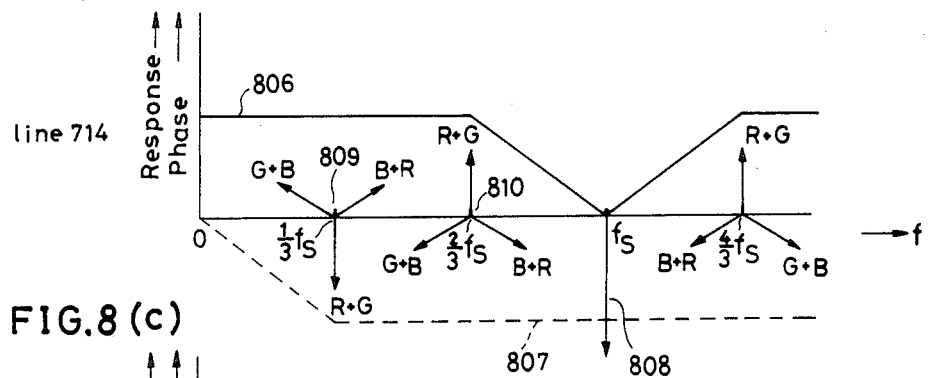

Reading of the signal is made as follows. Firstly in the odd number field, for a n-th scanning, a first line 713 and a second line 714 of the photoelectric elements are simultaneously read out, thereby to produce an n-th horizontal scanning signal. Then for the next scanning (n+1)-th scanning, a horizontal line 715 and the next horizontal 716 are simultaneously read out to produce (n+1)-th scanning signal. Then, in even number fields, horizontal lines 714 and 715 are simultaneously read out to produce n-th horizontal scanning signal. And in the next scanning, the horizontal lines 716 and 717 are simultaneously read out to produce (n+1)-th scanning signal. FIG. 8(a) and FIG. 8(b) show spectral distribution of the output signals obtained by the scannings, wherein FIG. 8(a) is signal from the odd number horizontal lines 713, 715, 717 . . . and FIG. 8(b) is signals obtained from the even number horizontal lines 714, 716, 718 . . . , and frequency $f_s$ is the carrier frequency produced by sampling by the photoelectric elements and by read-out from the solid state image pickup device. In the diagrams, solid line curves 801 and 806, designate fundamental band components of the signal obtained from the photoelectric elements, and the components shown by the dotted lines 802, 807 designate modulated components (folding components) which are generated by modulation by the sampling carrier 803 and 808 for the photoelectric elements, respectively. It is to be noted that the sampling carrier 803 and 808 of FIG. 8(a) and FIG. 8(b) are opposite to each other in their phases since photoelectric elements dispositions are shifted by $\tau_H/2$ between neighboring horizontal lines. Accordingly, the modulated components 802 and 807 become opposite to each other in their phases, and therefore by summing up the signals of FIG. 8(a) and FIG. 8(b), that is, by summing up the signals of the each other immediately neighboring horizontal lines 713 and 714, 714 and 715, . . . , the modulated components which hitherto made the folding distortion are eliminated. As has been elucidated, the above-mentioned modulated components are dependent on the objective image projected on the solid state imaging sensor. That is, when the objective image does not make change in the vertical direction, that is, when the vertical correlation is 1, the modulated components of FIG. 8(a) and FIG. 8(b) are just in opposite phases to each other. Accordingly, as in the present invention, which utilizes immediately neighboring horizontal lines of photoelectric elements, for instance, the horizontal lines 713 and 714 or 714 and 715 ... have largest correlation in the vertical direction. That is, in the present invention the correlation being the largest in a group of technical arts which use vertical correlation, and therefore, the elimination of the modulated components can be made substantially completely. Since the two horizontal lines are read out simultaneously, thereby removing the undesirable folding components, which are generated together with the sampling carrier, the vertical distance required for making vertical correlation of the objective image projected on the solid state image sensor can be half of the conventional case, for instance, of FIG. 1.

That is, the present invention, uses a pair of two signals having the largest vertical correlation with each other with respect to the objective image, then sums up at inverse phases and eliminates the components modulated by the sampling carrier to become the folding component, and carrier of chrominance signal. This is the best technical art among the technical arts using the vertical correlation of the image.

Figure 8C:
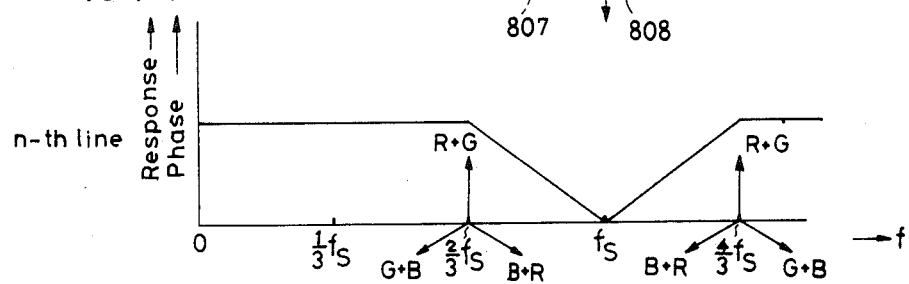

The present invention is also advantageous with respect to the elimination of the chrominance signal carriers as follows. Period of repetition of the stripe shaped color filters in the horizontal direction is equivalently at the spatial period of three pitches of disposition of the photoelectric elements, accordingly chrominance signal carriers are generated at $\frac{1}{3} \cdot f_s$ to the sampling frequency $f_s$. And the phases of these chrominance signal carriers have phases as shown by numerals 804 and 809 in FIG. 8(a) and FIG. 8(b), respectively. That is, when considered with respect to the chrominance signal carrier of $\frac{1}{3} \cdot f_s$ frequency, the signal from the picture elements 701 and 707 covered by the filters R+G have 180° phase difference from each other. Similarly, chrominance signal carriers for other picture elements of other color filter have with respect to each other 180° phase difference. Accordingly, these chrominance signal carriers are each other eliminated by summing up the signals of neighboring horizontal lines of FIG. 8(a) and FIG. 8(b), to results summed up signal shown in FIG. 8(c), where only $\frac{2}{3} \cdot f_s$ and $4/3 \cdot f_s$ chrominance signal carriers exist. Also in eliminating of the chrominance signal carrier, the above-mentioned vertical correlation of the objective image projected on the solid state imaging apparatus is important in the similar way as that of the elimination of the modulated components. That is, in the present invention where the immediately vertically neighboring two lines are simultaneously read out, the elimination of the undesirable chrominance signal carrier by the elimination is sufficiently made, and thereby a high resolution of reproduced picture by decreasing the distortion of the reproduced picture is assured.

Figure 9:
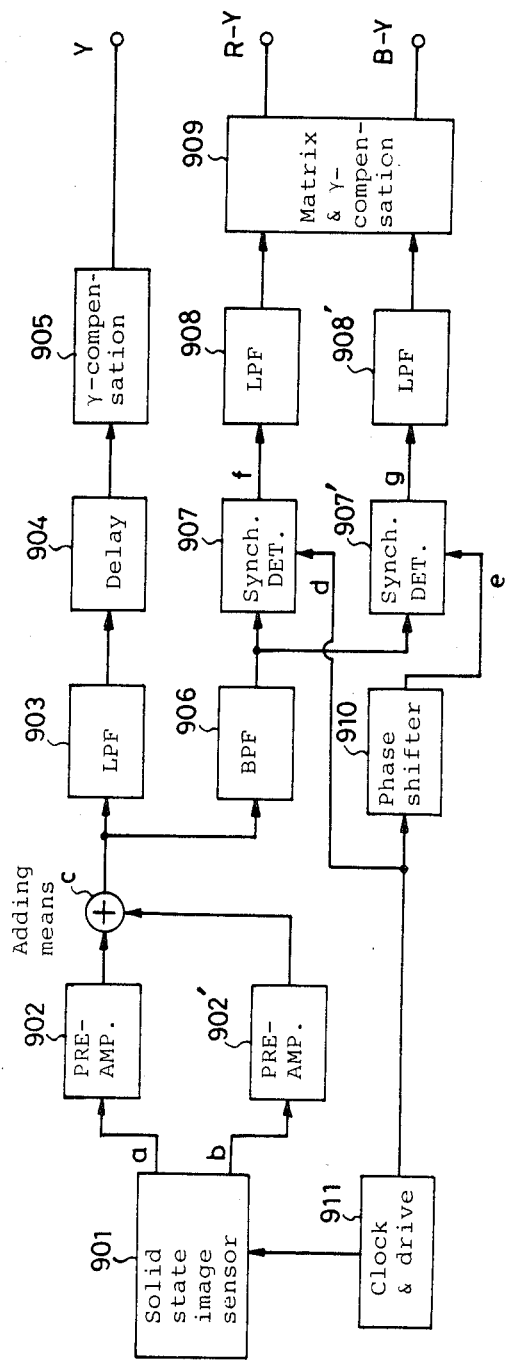
FIG. 9 is a circuit block diagram for processing the output signal of the solid state color image pickup device of the solid state color imaging apparatus of FIG. 7.

FIG. 9 shows one example of a circuit for processing the signal from the photoelectric elements of the solid state color image pickup device 901 shown in FIG. 7. Two kinds of output signals "a" and "b" are signals comprising the components shown in FIG. 8(a) and FIG. 8(b), respectively. The signals "a" and "b" are amplified by preamplifier 902 and 902', respectively and are given to adding means C to make addition of them. The ouput signal from the adding means C comprises the signal component shown in FIG. 8(c), and this signal is led to LPF 903 to remove chrominance carrier signal of $\frac{2}{3} \cdot f_s$ frequency, and given to a delay circuit 904 which compensate time delay in chrominance signal processing, and thereafter the output is given to a $\gamma$-compensation circuit 905 and led out to luminance signal output terminal Y. On the other hand, the signal from the adding means C is given also to a band-pass filter having a center frequency at $\frac{2}{3} \cdot f_s$ to take out the chrominance signal component having carrier frequency of $\frac{2}{3} \cdot f_s$ and given to a synchronous detector 907 to which a reference signal "d" is given from a clock and drive circuit 911. The same output from the BPF 906 is also led to another synchronous detector 907' to which a 90°-shifted reference signal through a phase shifter 910 is given. The output signals "f" and "g" of the synchronous detectors 907 and 907' are given through LPFs 908 and 908' to a matrix and $\gamma$-compensation circuit 909 which issues a pair of the color difference signals to output terminals R-Y and B-Y. The base band signal of the output "f" detected by utilizing the reference signal "d" is given by:

$$f = R + G - \frac{1}{2}\{(G + B) + (B + R)\} \qquad (2)$$
$$= R + \frac{1}{2}G - (B + \frac{1}{2}R).$$

And the base band signal of the output "g" detected by utilizing the reference signal "e" is given by $$g = \frac{\sqrt{3}}{2} (G + B) - \frac{\sqrt{3}}{2} (B + R) \qquad (3)$$

$$= \sqrt{3} (G - R).$$

Figure 10:
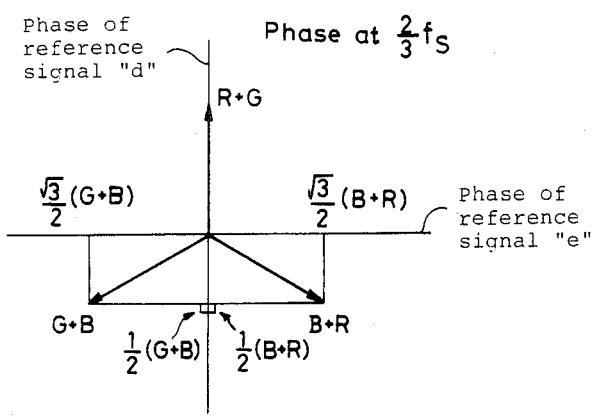
FIG. 10 is a phase diagram showing detection phase of the modulated chrominance signals.

There, R, G and B are absolute values of the signals obtained from the photoelectric elements covered by red filter, green filter and blue filter, respectively. Phase relationship of the above-mentioned signals are shown in FIG. 10, which shows an ideal state that the spatial relation between the photoelectric elements and the color filter is perfectly registered as shown in FIG. 7.

Figure 11:
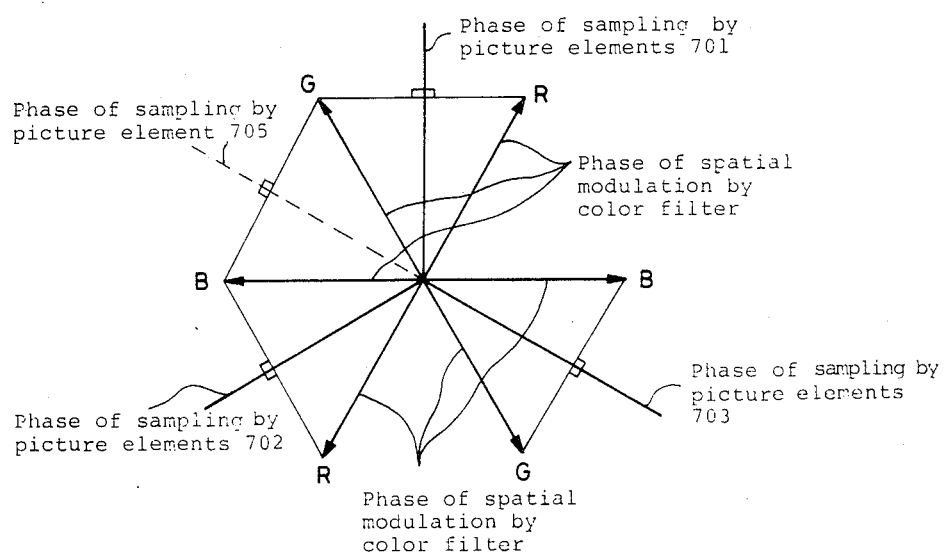
FIG. 11 is a phase diagram of chrominance signals which are sampled by the picture elements of solid state image pickup device in the apparatus of FIG. 7.

FIG. 11 shows phase relations of spatially modulated chrominance signals at sampling. This FIG. 11 is drawn by representing $3\tau_H$ (three spatial pitches of photoelectric elements disposition) to be $2\tau$, and the diagram shows the phase relation of the FIG. 7. When the relative spatial positions between the picture elements of the photoelectric elements and the stripe shaped color filters shift in the horizontal direction, the spatial modulation phase of the color filter rotates. As a result of the rotation, components to be sampled by the picture elements changes, but such change can be compensated by means of adjustment of phase relation of the synchronous detector 907 or the matrix circuit.

As has been described in detail with reference to the above-mentioned example, the apparatus in accordance with the present invention can provide a solid state color imaging apparatus of high resolution performance.

The above-mentioned example utilizes three kinds of color filter elements of different spectral characteristics on the color filter, but other color filter having three or more color filter elements of each other different spectral characteristics may be used. Furthermore, instead of the above-mentioned substantially vertical stripe shaped color filter elements other color filter having, for instance, mosaic or check disposition color filter elements may be used.

Further, when three kinds of color filter elements are disposed in the horizontal direction for the spatial period of 1½ (one and half) picture elements, the spatial relation between the picture elements and color filter elements becomes that two color filters in horizontal directions cover one picture element. Such type of half and half horizontally divided picture elements are suitable for actual use, for instance, those which have masking region such as aluminum wire vertically passes at the center part of the picture element, since horizontal registration of the dividing lines of the color filter and the picture element can be easily made by utilizing the aluminum wire region. Furthermore as has been elucidated, by employment of the substantially vertical stripe shaped color filter, there is no need of vertical registrations between the color filter and the photoelectric elements, and there is no undesirable effect of the crosstalks of light in the vertical direction. This is very much advantageous when the chip size of the solid state imaging apparatus becomes very small and number of picture elements becomes very great, for instance, when picture element pitch becomes 2 μm, or 1 μm. Furthermore, the present invention has the advantage that the mis-registration in horizontal direction can be compensated by circuitry of phase relation of the synchronous detector 907 or matrix circuit, thereby enabling easy manufacturing.

What is claimed is:

1. A solid state color imaging apparatus comprising:
   a solid state imaging sensor comprising a plurality of photoelectric elements regularly disposed in two-dimensional patterns, the disposition comprising a plurality of horizontal lines, each having a plurality of photoelectric elements in repetition at a predetermined horizontal pitch, wherein dispositions of the photoelectric elements in vertically neighboring horizontal lines are horizontally shifted by half the predetermined horizontal pitch,
   a color filter disposed substantially in front of said solid state imaging sensor and comprising a plurality of color filter elements equivalently having three spectral characteristics and disposed in a predetermined order of repetition in horizontal direction, in a manner to have repetition spatial period of 1½ times of said predetermined horizontal pitch,
   thereby producing a horizontal spatial relations between the color filter elements and photoelectric elements that photoelectric elements of vertically neighboring elements being covered by the same kind color filter elements in positions which are horizontally shifted by a horizontal distance of 1½ times said predetermined horizontal pitch, thereby repetition of combination of said photoelectric elements and said filter elements making 180° phase difference between neighboring lines of the photoelectric elements, and
   a circuit for reading output signals of said photoelectric elements, which in a field reads output signals simultaneously from odd number horizontal lines and subsequent neighboring even number horizontal lines and in the next field reads output signals simultaneously from an even number horizontal lines and subsequent neighboring odd number horizontal lines,
   a first synchronous detector and a second synchronous detector having about 90 degrees of phase difference between two reference signals of said first synchronous detector and second synchronous detector, wherein in case that a pitch of said picture element is equivalent to 240° of a phase of said reference signal of said synchronous detector, said both phases of said reference signals are varied by a phase value which is equivalent to an aberration of position between said imaging sensor and said color filter for amendment of an error part of output signals of said first synchronous detector and said second synchronous detector which is issued by said aberration of position between said imaging sensor and said color filter.

2. A solid state color imaging apparatus in accordance with claim 1, wherein
   said color filter has a plurality of substantially vertical stripe shaped color filter elements consisting of at least three spectral characteristics.

3. A solid state color imaging apparatus in accordance with claim 2, wherein
   said color filter has red color filter elements, green color filter elements and blue color filter elements.

4. A solid state color imaging apparatus in accordance with claim 1, wherein
   said color filter has red color filter elements, green color filter elements and blue color filter elements.

5. A solid state color imaging apparatus in accordance with claim 1, wherein
   said circuit has an adding means which issues sum of said output signals simultaneously read from two horizontal lines.

* * * * *